(12) United States Patent
Fu et al.

(10) Patent No.: US 11,256,164 B2
(45) Date of Patent: Feb. 22, 2022

(54) OPTICAL ELEMENT AND PROJECTION DEVICE USING THE SAME

(71) Applicant: Coretronic Corporation, Hsin-Chu (TW)

(72) Inventors: Mao-Min Fu, Hsin-Chu (TW); Hung-Pin Chen, Hsin-Chu (TW); Yen-Po Chang, Hsin-Chu (TW); Chien-Ming Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/195,646

(22) Filed: Mar. 9, 2021

(65) Prior Publication Data
US 2021/0286239 A1 Sep. 16, 2021

(30) Foreign Application Priority Data
Mar. 12, 2020 (CN) .......................... 202020299878.0

(51) Int. Cl.
| | |
|---|---|
| *G03B 21/14* | (2006.01) |
| *G02B 5/04* | (2006.01) |
| *H04N 9/31* | (2006.01) |
| *G03B 21/20* | (2006.01) |

(52) U.S. Cl.
CPC ............. *G03B 21/142* (2013.01); *G02B 5/04* (2013.01); *G03B 21/145* (2013.01); *G03B 21/2033* (2013.01); *H04N 9/31* (2013.01)

(58) Field of Classification Search
CPC ...... G03B 21/00; G03B 21/14; G03B 21/142; G03B 21/145; G03B 21/2033; G02B 5/04; H04N 9/31; H04N 9/3102; H04N 9/3108; H04N 9/3111
USPC ........................................................ 353/81, 97
See application file for complete search history.

(56) References Cited

U.S. PATENT DOCUMENTS

| | | | | |
|---|---|---|---|---|
| 6,324,020 | B1 * | 11/2001 | Teng | .................. G06K 9/00046 |
| | | | | 359/726 |
| 2021/0063616 | A1 * | 3/2021 | Seo | ......................... G02B 5/04 |
| 2021/0063617 | A1 * | 3/2021 | Yang | ........................ G02B 5/04 |

FOREIGN PATENT DOCUMENTS

| | | |
|---|---|---|
| CN | 1588227 A | 3/2005 |
| CN | 206573842 U | 10/2017 |
| TW | 201821895 A | 6/2018 |

* cited by examiner

*Primary Examiner* — William C. Dowling

(57) ABSTRACT

An optical element includes a prism and a light blocking member. The prism has a first surface, a second surface and a third surface. The first surface is connected to the second surface. The third surface is connected between the first and second surfaces and opposite to a light valve of a projection device. The first surface reflects an image light beam from the light valve to allow the image light beam to pass through the second surface. The light blocking member is disposed on the prism and includes a first light blocking portion and a second light blocking portion adjacent to each other. The first light blocking portion shields a part of the first surface adjacent to the second surface, and the second light blocking portion shields a part of the second surface adjacent to the first surface. A projection device using the optical element is also provided.

18 Claims, 6 Drawing Sheets

OPTICAL ELEMENT AND PROJECTION DEVICE USING THE SAME

CROSS-REFERENCE TO RELATED APPLICATION

This application claims the priority benefit of China application (CN202020299878.0), filed on Mar. 12, 2020. The entirety of the above-mentioned patent application is hereby incorporated by reference herein and made a part of this specification.

FIELD OF THE INVENTION

The invention relates to an optical element, and more particularly to an optical element used for a projection device and the projection device.

BACKGROUND OF THE INVENTION

In some projection devices, a digital micro-mirror device (DMD) may be provided to convert an illumination light beam provided by a light source into an image light beam. The light beam passing through the digital micro-mirror device may generate a lot of heat, which may affect the reliability of the projection device and the performance and service life of the internal optical elements. In the projection device, an optical prism can be partially coated with ink to block light. However, although ink coating can block stray light, there are still some light beams that can generate a lot of heat, which may affect the reliability of optical elements and the projection device.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an optical element with better light blocking effect.

The invention provides a projection device with better reliability.

Other advantages and objects of the invention may be further illustrated by the technical features broadly embodied and described as follows.

In order to achieve one or a portion of or all of the objects or other objects, the optical element provided by the embodiments of the invention includes a prism and a light blocking member. The prism has a first surface, a second surface and a third surface. The first surface is connected to the second surface. The third surface is connected between the first surface and the second surface and opposite to a light valve of a projection device. The first surface reflects an image light beam from the light valve to allow the image light beam to pass through the second surface. The light blocking member is disposed on the prism and includes a first light blocking portion and a second light blocking portion adjacent to each other. The first light blocking portion shields a part of the first surface adjacent to the second surface, and the second light blocking portion shields a part of the second surface adjacent to the first surface.

In order to achieve one or a portion of or all of the objects or other objects, the projection device provided by the embodiments of the invention includes an illumination system, a light valve, a projection lens and the aforementioned optical element. The illumination system is configured to provide an illumination light beam. The light valve is located on a transmission path of the illumination light beam and is configured to convert the illumination light beam into an image light beam. The projection lens is located on a transmission path of the image light beam and is configured to project the image light beam. The optical element is disposed between the light valve and the projection lens. The second surface of the optical element is opposite to the projection lens, and the third surface is opposite to the light valve. The illumination light beam can pass through the first surface and the third surface to be transmitted to the light valve. The first surface can reflect the image light beam from the light valve, so that the image light beam passes through the second surface to the projection lens.

In the optical element of the invention, the light blocking member is provided on the prism to shield stray light, so as to prevent the heat of the light beam from damaging other optical elements. The projection device of the invention includes the aforementioned optical element and has better reliability.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
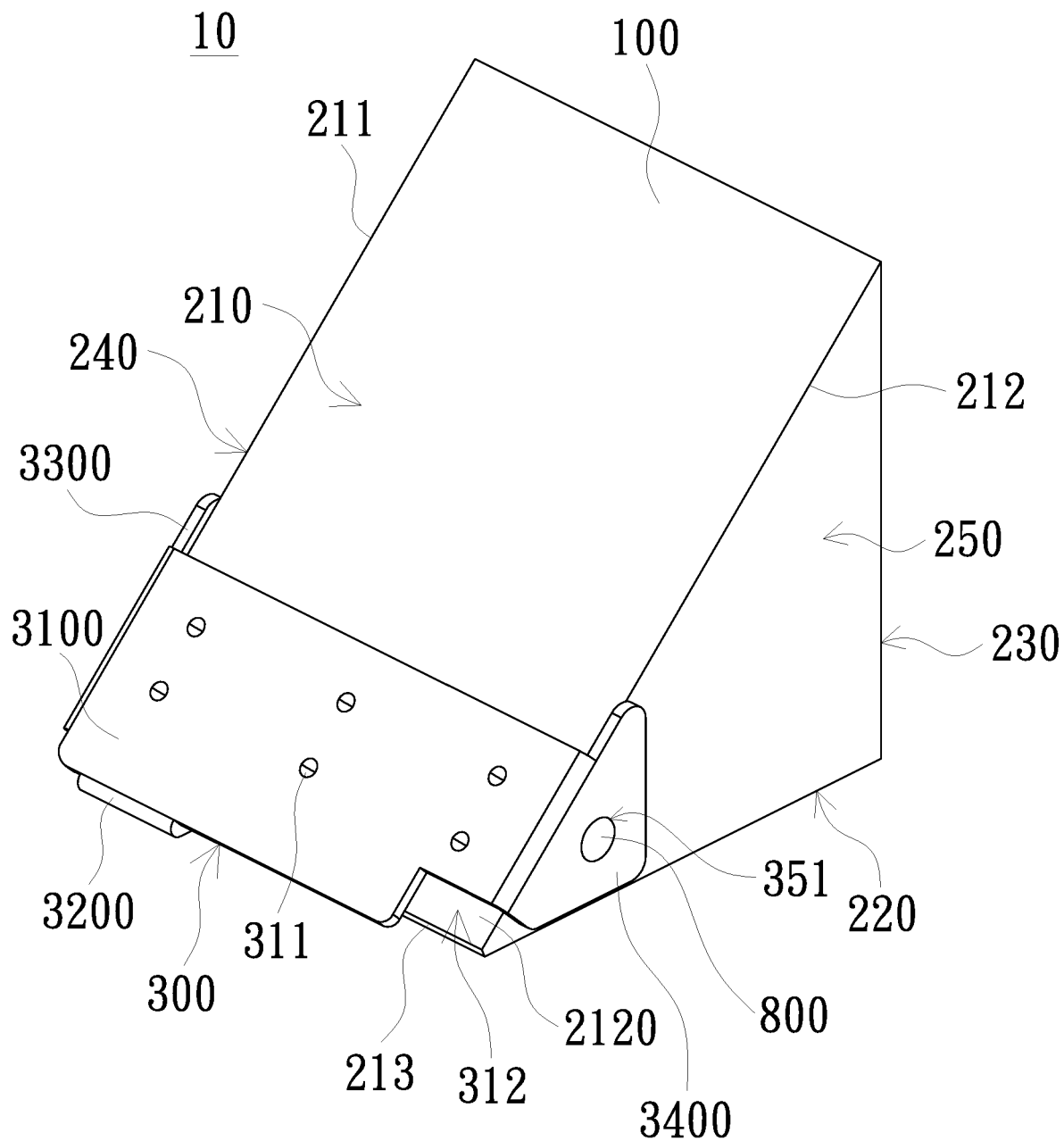
FIG. 1 is a schematic perspective view of an optical element according to an embodiment of the invention.

FIG. 1 is a schematic perspective view of an optical element according to an embodiment of the invention. The optical element of this embodiment is used in a projection device. As shown in FIG. 1, the optical element 10 includes a prism 100 and a light blocking member 300. The prism 100 has a first surface 210, a second surface 220 and a third surface 230. The first surface 210 is connected to the second surface 220, the third surface 230 is connected between the first surface 210 and the second surface 220, and a light valve (not shown) of the projection device is disposed opposite to the third surface 230. The first surface 210 can reflect the image light beam from the light valve, so that the image light beam passes through the second surface 220. The transmission of the image light beam will be described in detail later.

In some embodiments, the prism 100 may be a triangular prism, and the first surface 210, the second surface 220 and the third surface 230 are the prism surfaces of the triangular prism and are rectangular. The first surface 210 has a first side 211, a second side 212 and a third side 213. The first side 211 and the second side 212 are opposite to each other, and the third side 213 is connected between the first surface 210 and the second surface 220 and between the first side 211 and the second side 212. The prism 100 of this embodiment may further have a fourth surface 240 and a fifth surface 250. Both of the fourth surface 240 and the fifth surface 250 may be connected among the first surface 210, the second surface 220 and the third surface 230; and the fourth surface 240 and the fifth surface 250 may be opposite to each other. In some embodiments, the fourth surface 240 may be adjacent to the first side 211 of the first surface 210, and the fifth surface 250 may be adjacent to the second side 212 of the first surface 210. The fourth surface 240 may be opposite to the fifth surface 250, and the fourth surface 240 and the fifth surface 250 may be two triangular sides of the prism 100 (triangular prism).

Figure 2:
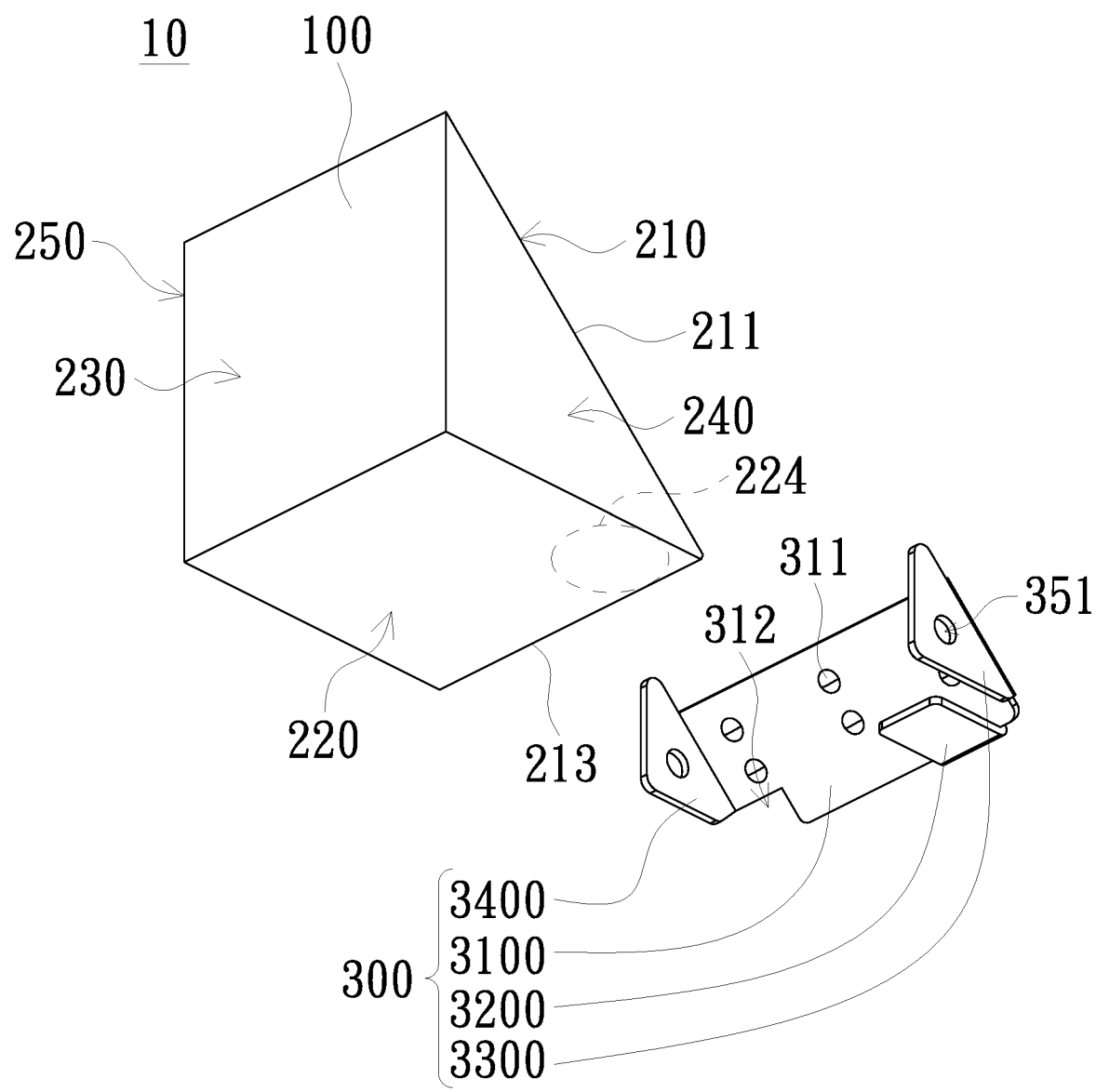
FIG. 2 is a schematic exploded view of the optical element shown in FIG. 1 viewed from another angle.

FIG. 2 is a schematic exploded view of the optical element viewed from another angle. As shown in FIGS. 1 and 2, the optical element 10 includes a light blocking member 300. The light blocking member 300 is disposed on the prism 100 and is preferably fixed on the prism 100. The light blocking member 300 includes a first light blocking portion 3100 and a second light blocking portion 3200 adjacent to each other. The first light blocking portion 3100 shields a part of the first surface 210, for example, the first light blocking portion 3100 shields the part of the first surface 210 adjacent to the second surface 220. In this embodiment, the second light blocking portion 3200 shields a part of the second surface 220, for example, the second light blocking portion 3200 shields the part of the second surface 220 adjacent to the first surface 210. In some embodiments, the material of the light blocking member 300 may be plastic, such as poly(butylene succinate) (PBS) plastic, polyetherimide (PEI) plastic, or metal, such as copper, aluminum, aluminum alloy, etc., but is not limited thereto. Further, the first light blocking portion 3100 and the second light blocking portion 3200 of the light blocking member 300 may be metal plates or plastic plates. The light blocking member 300 may be an integrated molding member and the first light blocking portion 3100 is bent relative to the second light blocking portion 3200, so that the light blocking member 300 has a shape corresponding to the prism 100. In some embodiments, the light blocking member 300 is disposed at the third side 213 adjacent to the first surface 210 and placed on the prism 100 by abutting against the first surface 210 and the second surface 220 of the mirror 100. In other embodiments, the light blocking member 300 may further include other structures for fixing the main body of the light blocking member 300 onto the prism 100. In this embodiment, the light blocking member 300 can be disposed on the prism 100 and take up less space. Further, in the case where the light blocking member 300 is a metal plate member, the light blocking member 300 can shield the stronger light beam since the metal has better heat resistance.

Figure 3:
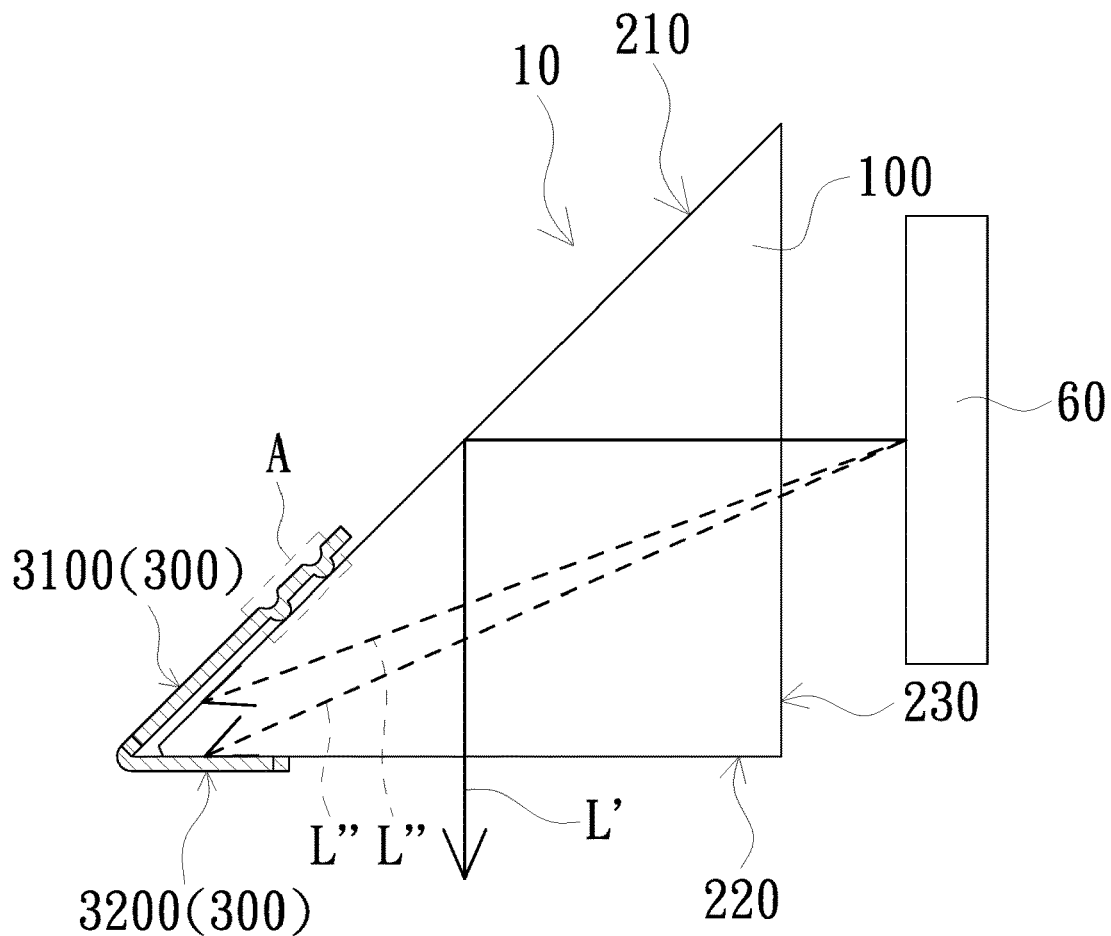
FIG. 3 is a schematic view of the relationship between the optical element of the embodiment shown in FIG. 1 and a light valve.

FIG. 3 is a schematic view of the relationship between the optical element 10 and the light valve. As shown in FIG. 3, the third surface 230 of the prism 100 of the optical element 10 is opposed to the light valve 60 of the projection device. The image light beam L' generated by the light valve 60 can enter the prism 100 from the third surface 230, be transmitted to the first surface 210, reflected by the first surface 210 (total reflection), pass through the second surface 220 and then enter the projection lens (will be described in detail later). In some embodiments, other light beams (e.g., the light beam L") generated by the light valve 60 are not transmitted to the first surface 210 or do not enter the projection lens by passing through the second surface 220 after being transmitted to the first surface 210. In this case, the light beam L" may be transmitted to the light blocking member 300 after being incident on the prism 100, or the light beam L" may become stray light after being reflected multiple times and shielded by the light blocking member 300.

The optical element 10 of this embodiment includes a prism 100 and a light blocking member 300 disposed on the prism 100. The light blocking member 300 can shield stray light (e.g., the light beam L") according to requirements and can be used to prevent the heat generated by the stray light (e.g., the light beam L″) from damaging other components, thereby improving reliability.

In this embodiment, the light blocking member 300 has a shape corresponding to the prism 100, which helps to effectively use the space of the housing.

In one embodiment, the light blocking member 300 can be made of dark material or painted with dark paint. Further, the light blocking member 300 may be coated with high-temperature paint to improve light absorption efficiency. In another embodiment, the light blocking member 300 may improve its heat resistance and increase the mechanical properties on the surface by specific processes such as anodizing or electroplating, but the invention is not limited to thereto. In other embodiments, the light blocking member 300 can also be manufactured by plasma anodizing or electrophoresis processes. In some embodiments, the light blocking member 300 may be spaced apart from the prism 100. Specifically, the light blocking member 300 is spaced apart from the first surface 210 and/or the second surface 220 of the prism 100 to avoid heat conduction from the light blocking member 300 to the prism 100. The heat can be dissipated by the heat convection between the light blocking member 300 and the ambient airflow.

In some embodiments, the light blocking positions of the first light blocking portion 3100 relative to the first surface 210 and/or the second light blocking portion 3200 relative to the second surface 220 may be different according to the different positions of light spots of the image light beam L′ on the first surface 210 and/or the second surface 220, thereby preventing the first light blocking portion 3100 or the second light blocking portion 3200 from shielding the image light beam L′. For example, as shown in FIGS. 1 and 2, the first light blocking portion 3100 of the light blocking member 300 of this embodiment is disposed along the third side 213 of the prism 100, for example. Further, on the first surface 210, the first light blocking portion 3100 extends from the first side 211 to the second side 212; and on the second surface 220, the second light blocking portion 3200 shields only one corner, such as the first corner 224 on the second surface 220 closer to the first side 211 (as shown in FIG. 2). In this embodiment, the arrangement that the second light blocking portion 3200 shields the first corner 224 can avoid shielding the image light beam L′.

As shown in FIGS. 1 and 2, the light blocking member 300 of this embodiment may further include a third light blocking portion 3300 and a fourth light blocking portion 3400 for positioning the light blocking member 300. The third light blocking portion 3300 and the fourth light blocking portion 3400 can be connected to the first light blocking portion 3100 and respectively disposed at opposite ends of the first light blocking portion 3100, so as to be clamped on the fourth surface 240 and the fifth surface 250 of the prism 100. For example, the third light blocking portion 3300 and the fourth light blocking portion 3400 can be clamping portions to be clamped on the fourth surface 240 and the fifth surface 250, respectively. In this embodiment, the third light blocking portion 3300 shields a part of the fourth surface 240, and the fourth light blocking portion 3400 shields a part of the fifth surface 250. In this embodiment, the third light blocking portion 3300 and the fourth light blocking portion 3400 may have a light blocking function or a clamping function, but the invention is not limited thereto. In other embodiments, the third light blocking portion 3300 and the fourth light blocking portion 3400 may not have a clamping function, and the light blocking member 300 is fixed to the prism 100 by other means. Specifically, the third light blocking portion 3300 and the fourth light blocking portion 3400 may be, for example, metal (elastic) sheets, metal plates, or plastic plates. In the embodiment shown in FIGS. 1 and 2, the third light blocking portion 3300 and the fourth light blocking portion 3400 are respectively bent relative to the first light blocking portion 3100, and the third light blocking portion 3300 and the fourth light blocking portion 3400 can respectively contact the fourth surface 240 and the fifth surface 250.

In some embodiments, the gap between the first light blocking portion 3100 and the first surface 210 and/or the gap between the second light blocking portion 3200 and the second surface 220 can be adjusted by adjusting the clamping position of the third light blocking portion 3300 and/or the fourth light blocking portion 3400 relative to the prism 100. In this embodiment, there is preferably a gap between the first light blocking portion 3100 and the first surface 210 to prevent heat conduction from the light blocking member 300 to the prism 100, thereby preventing the service life of the prism 100 from being reduced due to high temperature. In other embodiments, the second light blocking portion 3200 can be disposed on the second surface 220, or the gap between the second light blocking portion 3200 and the second surface 220 may be smaller than the gap between the first light blocking portion 3100 and the first surface 210, but the invention is not limited thereto.

Figure 4:
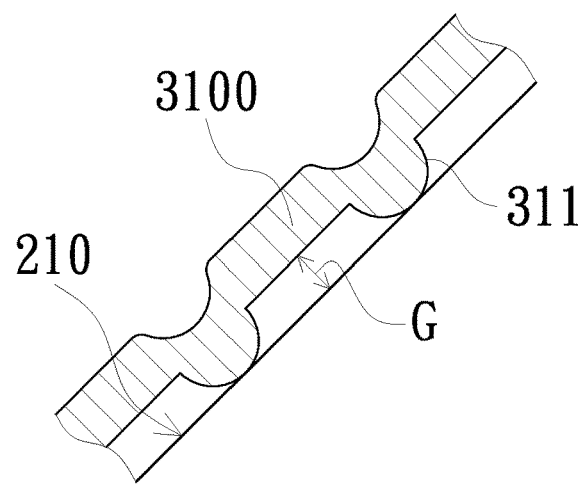
FIG. 4 is a schematic partial cross-sectional view of the optical element of the embodiment shown in FIG. 3.

FIG. 4 is a schematic cross-sectional view of a part A of the optical element of the embodiment shown in FIG. 3. As shown in FIGS. 1, 2 and 4, the first light blocking portion 3100 of this embodiment may further have a plurality of convex structures 311 convex toward the first surface 210 of the prism 100. The convex structures 311 bear against the first surface 210. The convex structure 311 may be formed by stamping, for example, but is not limited thereto. The height of the convex structure 311 can be designed so that an appropriate gap G is provided between the the first light blocking portion 3100 and the first surface 210.

As shown in FIGS. 1 and 2, the optical element 10 of this embodiment may further include an adhesive material 800 disposed between the light blocking member 300 and the prism 100. The adhesive material 800 is configured to fix the light blocking member 300 and the prism 100 to help improve the shock resistance and reliability of the optical element 10. The third light blocking portion 3300 and/or the fourth light blocking portion 3400 may further have a through hole 351. The through hole 351 can be formed by, for example, stamping, but is not limited thereto. The adhesive material 800 can be disposed at the through hole 351. For example, the adhesive material 800 may be disposed at the through hole 351 after the third light blocking portion 3300 and the fourth light blocking portion 3400 are clamped on the prism 100, so that the third light blocking portion 3300 and the fourth light blocking portion 3400 are respectively adhered to the four surface 240 and the fifth surface 250 to ensure and maintain an appropriate gap between the first light blocking portion 3100 and the first surface 210 and between the second light blocking portion 3200 and the second surface 220. In the embodiment of the invention, for example, the light blocking member 300 can be disposed at a predetermined position on the prism 100 by an assembling tool, and then the adhesive material 800 is provided to fix the light blocking member 300 and the prism 100. However, the adhesive material 800 is not limited to be provided in the through hole 351. In other embodiments as shown in FIGS. 1 and 2, the first light blocking portion 3100 may have a notch 312. The notch 312 preferably exposes a corner 2120 of the first surface 210 adjacent to the second side 212. In this embodiment, the adhesive material 800 may be disposed at the notch 312 and adhered to the corner 2120 of the first surface 210. It should be noted that the through hole 351 and the notch 312 can be selectively configured; that is, one or both of the through hole 351 and the notch 312 can be selected to dispose on the light blocking member 300. The adhesive material 800 can also be selectively disposed at the through hole 351 and the notch 312; that is, one or both of the through hole 351 and the notch 312 can be selected to be disposed with the adhesive material 800. In some embodiments, the adhesive material 800 is, for example, UV glue.

Figure 5:
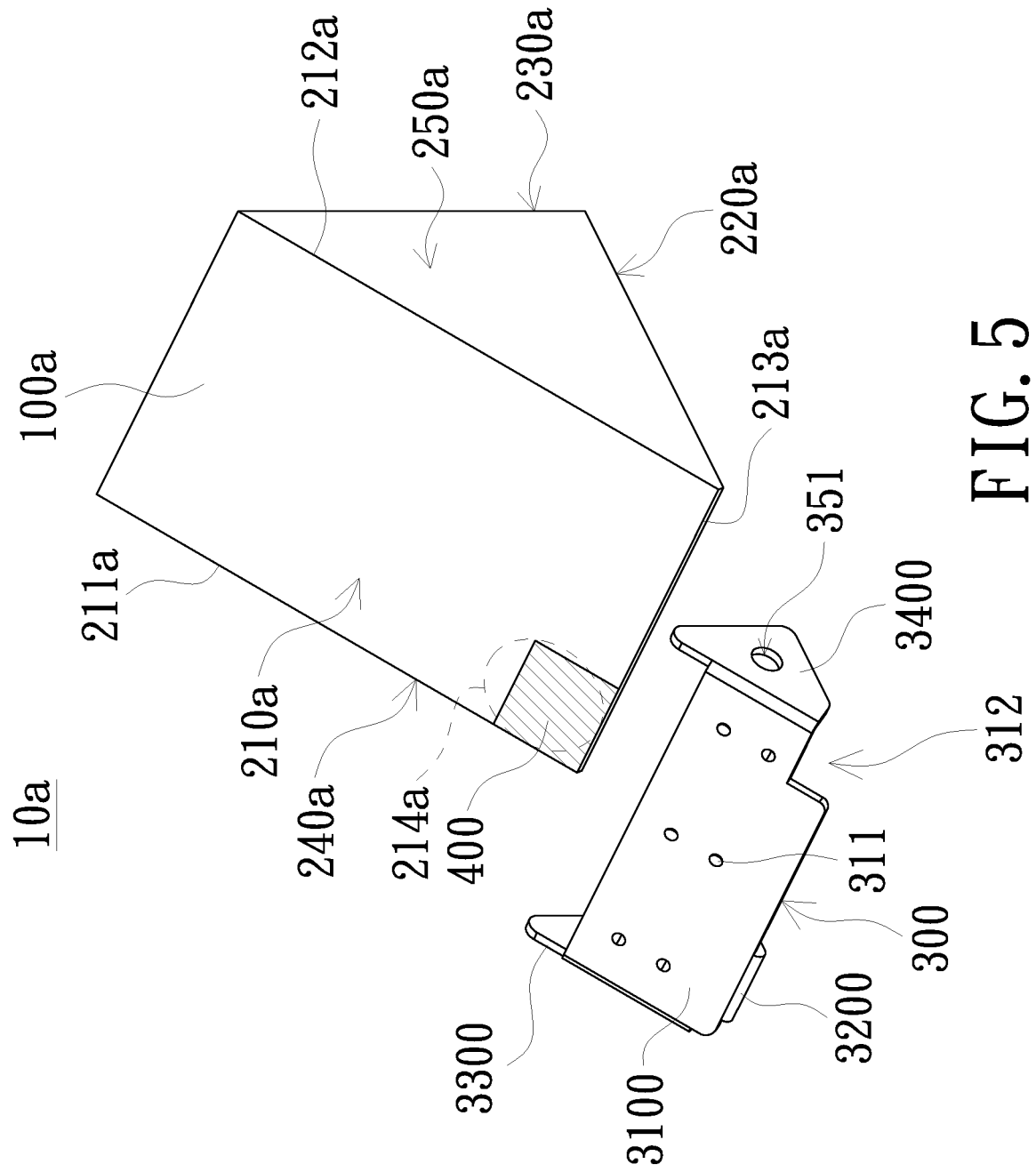
FIG. 5 is a schematic exploded view of an optical element according to another embodiment of the invention.
Figure 6:
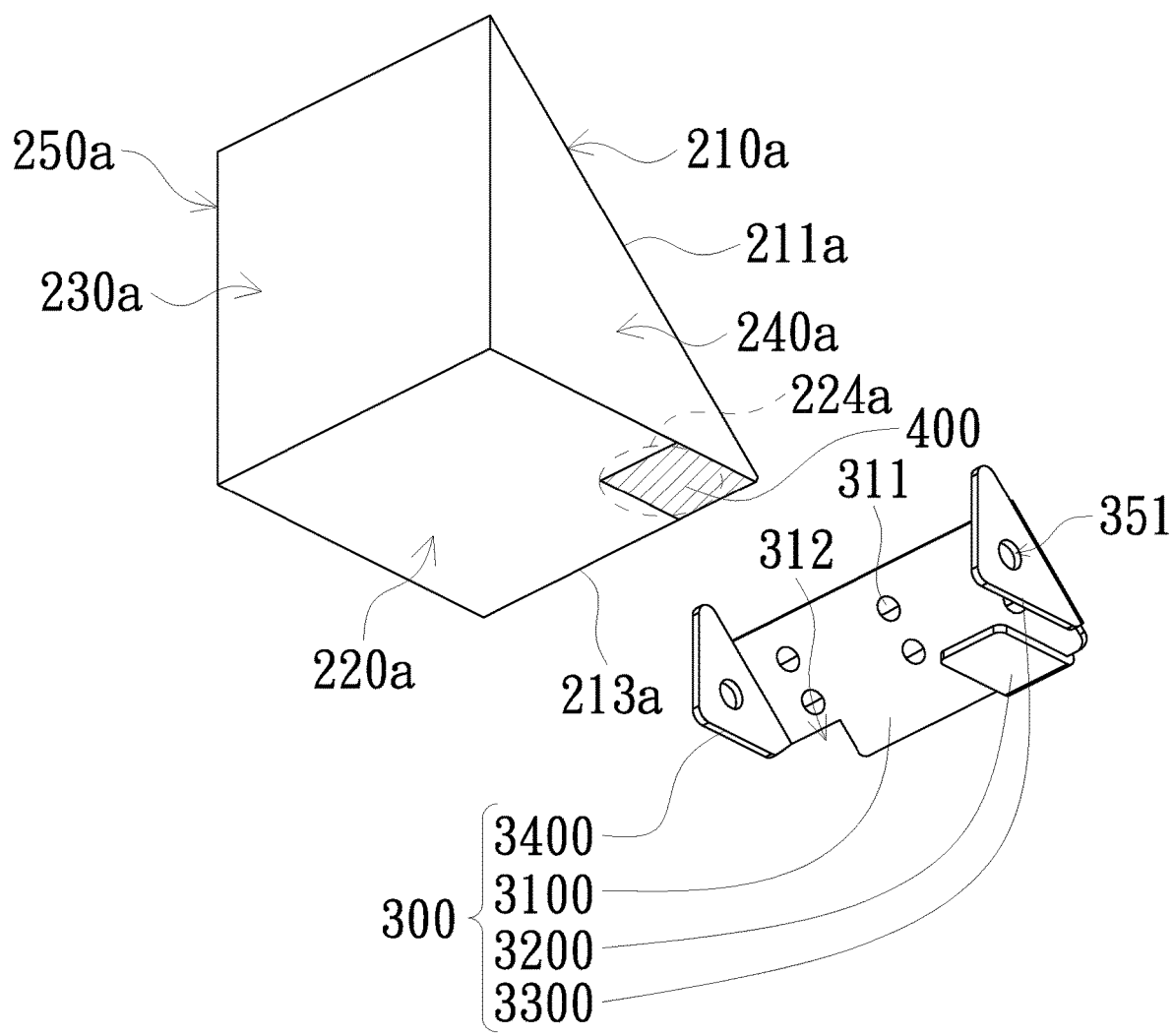
FIG. 6 is a schematic exploded view of the optical element shown in FIG. 5 viewed from another angle.

FIGS. 5 and 6 are schematic exploded views of an optical element according to another embodiment of the invention. As shown in FIGS. 5 and 6, the optical element 10*a* includes a prism 100*a* and a light blocking member 300. The main difference between the optical element 10*a* and the optical element 10 is that the prism 100*a* further has light blocking ink 400, and the light blocking member 300 can shield the light blocking ink 400, for example. The light blocking ink 400 may be coated at the second corner 214*a* (shown in FIG. 5) on the first surface 210*a* and/or the first corner 224*a* (shown in FIG. 6) on the second surface 220*a*. In this embodiment, the second corner 214*a* on the first surface 210*a* is located at the junction of the first side 211*a* and the third side 213*a*, but the invention is not limited thereto. The light blocking ink 400 can be used to absorb stray light. In another embodiment, the light blocking ink 400 may be replaced by other black processes (e.g., using black tape).

Figure 7:
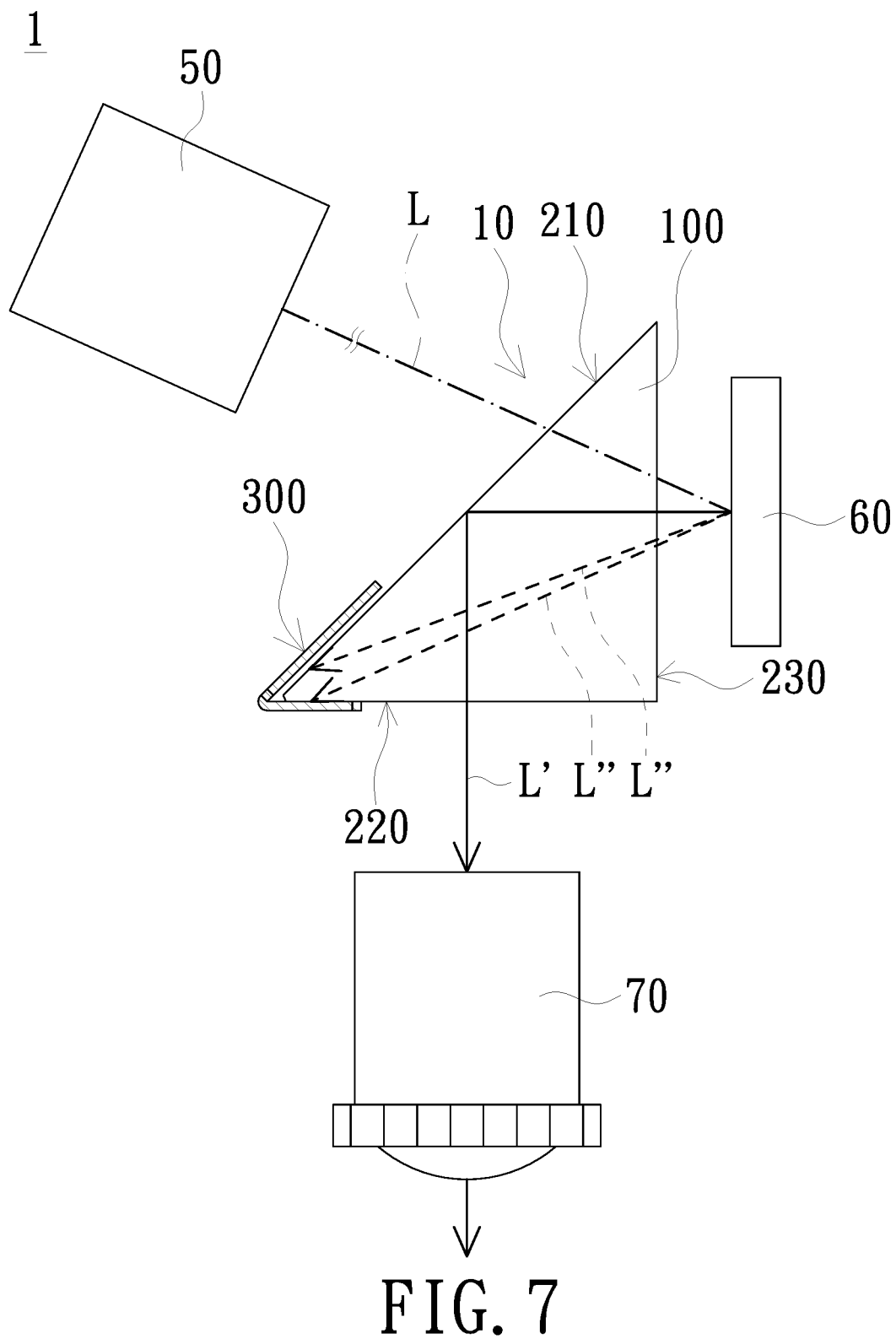
FIG. 7 is a schematic view of an optical path of a projection device according to an embodiment of the invention.

FIG. 7 is a schematic view of an optical path of a projection device according to an embodiment of the invention. As shown in FIG. 7, the projection device 1 includes an illumination system 50, a light valve 60, a projection lens 70 and an optical element 10. The illumination system 50 is configured to provide an illumination light beam L. The light valve 60 is located on the transmission path of the illumination light beam L and is configured to convert the illumination light beam L into an image light beam L'. The projection lens 70 is located on the transmission path of the image light beam L' and is configured to project the image light beam L'. The illumination system 50 includes a light source and required optical elements. The light source is configured to provide the illumination light beam L and includes, for example, more than one laser element (not shown). The laser elements are arranged in an array, and the laser elements are laser diodes (LDs), for example. The light source is, for example, a solid-state illumination source such as a light emitting diode. The light source can also be a metal halogen bulb or an ultra-high pressure mercury bulb. In some embodiments, the optical element 10 includes a prism 100 and a light blocking member 300 (as shown in FIG. 1). The illumination system 50 includes the required optical elements, and the optical elements may further include a light combining element, a color filter, a light homogenizing element, a condenser lens, etc., for transmitting the illumination light beam L to the prism 100 and then to the light valve 60. The light valve 60 is, for example, a reflective light valve, wherein the reflective light valve may be a digital micro-mirror device (DMD) or a liquid crystal on silicon (LCOS) panel, but is not limited to thereto.

In the embodiment shown in FIG. 7, the optical element 10 is disposed between the light valve 60 and the projection lens 70 and is configured to transmit the image light beam L' to the projection lens 70. Further, the second surface 220 of the prism 100 is opposite to the projection lens 70, and the third surface 230 is opposite to the light valve 60. As shown in FIG. 7, the illumination light beam L may pass through the first surface 210 and the third surface 230 of the prism 100 and be transmitted to the light valve 60. The light valve 60 converts the illumination light beam L into an image light beam L' and other light beams L". The image light beam L' is reflected to the prism 100 and the first surface 210 reflects the image light beam L', so that the image light beam L' passes through the second surface 220, is transmitted to the projection lens 70, and is projected on the screen (not shown) by the projection lens 70, thereby forming an image on the screen.

On the other hand, the other light beams L" may become stray light after a plurality of reflections. The other light beams L" are transmitted to the light blocking member 300 and is absorbed by the light blocking member 300. Therefore, the projection device 1 of this embodiment can effectively prevent the other light beams L" from traveling to the projection lens 70 to affect the image quality and prevent the heat generated by the other light beams L" from reducing the service life of the optical elements, so as to make the projection device 1 has better reliability. In this embodiment, the optical element 10 is used as an example for description; however, it is understood that the optical element 10*a* can also be used in the projection device 1.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the first light blocking portion, the second light blocking portion, the first side, the second side, the first corner, and the second corner are only used for distinguishing various elements and do not limit the number of the elements.

What is claimed is:

1. An optical element used in a projection device, the optical element comprising a prism and a light blocking member, wherein:
   the prism has a first surface, a second surface and a third surface, the first surface is connected to the second surface, the third surface is connected between the first surface and the second surface and opposite to a light valve of the projection device, and the first surface reflects an image light beam from the light valve to allow the image light beam to pass through the second surface; and
   the light blocking member is disposed on the prism and comprises a first light blocking portion and a second light blocking portion adjacent to each other, wherein the first light blocking portion shields a part of the first surface adjacent to the second surface, and the second light blocking portion shields a part of the second surface adjacent to the first surface.

2. The optical element according to claim 1, wherein the first surface has a first side, a second side and a third side, the first side and the second side are opposite to each other, the third side is connected between the first surface and the second surface and is connected between the first side and the second side, the first light blocking portion extends from the first side to the second side, and the second light blocking portion is adjacent to the first side and shields a first corner of the second surface adjacent to the first side.

3. The optical element according to claim 2, wherein the prism further has a fourth surface and a fifth surface opposite to each other, both of the fourth surface and the fifth surface are connected among the first surface, the second surface and the third surface, the light blocking member further has a third light blocking portion and a fourth light blocking portion connected to the first light blocking portion, the third light blocking portion shields a part of the fourth surface, and the fourth light blocking portion shields a part of the fifth surface.

4. The optical element according to claim 3, wherein the third light blocking portion and the fourth light blocking portion each are a clamping portion to be respectively clamped on the fourth surface and the fifth surface.

5. The optical element according to claim 3, wherein the third light blocking portion and the fourth light blocking portion each have a through hole, the optical element further comprises an adhesive material disposed at the through hole of the third light blocking portion and the through hole of the fourth light blocking portion and adhered to the fourth surface and the fifth surface.

6. The optical element according to claim 2, wherein the first light blocking portion has a notch for exposing a corner of the first surface adjacent to the second side, and the optical element further comprises an adhesive material adhered to the first surface through the notch.

7. The optical element according to claim 2, wherein the optical element further has a light blocking ink for shielding the first corner and a second corner of the first surface adjacent to the first corner, and the light blocking member shields the light blocking ink.

8. The optical element according to claim 1, wherein the first light blocking portion has a plurality of convex structures protruding toward the first surface, and the plurality of convex structures bears against the first surface.

9. The optical element according to claim 1, wherein the light blocking member comprises a metal light blocking member or a plastic light blocking member.

10. A projection device comprising an illumination system, a light valve, a projection lens and an optical element, wherein:
    the illumination system is configured to provide an illumination light beam;
    the light valve is located on a transmission path of the illumination light beam and is configured to convert the illumination light beam into an image light beam;
    the projection lens is located on a transmission path of the image light beam and is configured to project the image light beam; and
    the optical element is disposed between the light valve and the projection lens, and the optical element comprises a prism and a light blocking member, wherein:
      the prism has a first surface, a second surface and a third surface, the first surface is connected to the second surface, the third surface is connected between the first surface and the second surface, the second surface is opposite to the projection lens, the third surface is opposite to the light valve, the illumination light beam passes through the first surface and the third surface and is transmitted to the light valve, and the first surface reflects the image light beam from the light valve to allow the image light beam to pass through the second surface and be transmitted to the projection lens; and
      the light blocking member is disposed on the prism and comprises a first light blocking portion and a second light blocking portion adjacent to each other, wherein the first light blocking portion shields a part of the first surface adjacent to the second surface, and the second light blocking portion shields a part of the second surface adjacent to the first surface.

11. The projection device according to claim 10, wherein the first surface has a first side, a second side and a third side, the first side and the second side are opposite to each other, the third side is connected between the first surface and the second surface and is connected between the first side and the second side, the first light blocking portion extends from the first side to the second side, and the second light blocking portion is adjacent to the first side and shields a first corner of the second surface adjacent to the first side.

12. The projection device according to claim 11, wherein the prism further has a fourth surface and a fifth surface opposite to each other, both of the fourth surface and the fifth surface are connected among the first surface, the second surface and the third surface, the light blocking member further has a third light blocking portion and a fourth light blocking portion connected to the first light blocking portion, the third light blocking portion shields a part of the fourth surface, and the fourth light blocking portion shields a part of the fifth surface.

13. The projection device according to claim 12, wherein the third light blocking portion and the fourth light blocking portion each are a clamping portion to be respectively clamped on the fourth surface and the fifth surface.

14. The projection device according to claim 12, wherein the third light blocking portion and the fourth light blocking portion each have a through hole, the optical element further comprises an adhesive material disposed at the through hole of the third light blocking portion and the through hole of the fourth light blocking portion and adhered to the fourth surface and the fifth surface.

15. The projection device according to claim 11, wherein the first light blocking portion has a notch for exposing a corner of the first surface adjacent to the second side, and the optical element further comprises an adhesive material adhered to the first surface through the notch.

16. The projection device according to claim 11, further comprising a light blocking ink for shielding the first corner and a second corner of the first surface adjacent to the first corner, and the light blocking member shields the light blocking ink.

17. The projection device according to claim 10, wherein the first light blocking portion has a plurality of convex structures protruding toward the first surface, and the plurality of convex structures bears against the first surface.

18. The projection device according to claim 10, wherein the light blocking member comprises a metal light blocking member or a plastic light blocking member.

* * * * *